United States Patent
Shiitani et al.

(10) Patent No.: US 8,406,606 B2
(45) Date of Patent: Mar. 26, 2013

(54) PLAYBACK APPARATUS AND PLAYBACK METHOD

(75) Inventors: Shuichi Shiitani, Kawasaki (JP); Masaki Ishihara, Kawasaki (JP); Takayuki Baba, Kawasaki (JP); Susumu Endo, Kawasaki (JP); Daiki Masumoto, Kawasaki (JP); Shigemi Nagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 396 days.

(21) Appl. No.: 12/764,350

(22) Filed: Apr. 21, 2010

(65) Prior Publication Data

US 2010/0272411 A1    Oct. 28, 2010

(30) Foreign Application Priority Data

Apr. 22, 2009 (JP) ................... 2009-104428

(51) Int. Cl.
  *H04N 9/80* (2006.01)
  *G06K 9/46* (2006.01)
(52) U.S. Cl. ...................... 386/248; 382/190
(58) Field of Classification Search ........... 382/173, 382/225, 226; 386/231, 240–248, 278, 343; 709/232; 715/203; 725/46, 60
  See application file for complete search history.

(56) References Cited

U.S. PATENT DOCUMENTS

| | | | | |
|---|---|---|---|---|
| 6,751,776 | B1* | 6/2004 | Gong | 715/203 |
| 2002/0157095 | A1* | 10/2002 | Masumitsu et al. | 725/46 |
| 2003/0217091 | A1* | 11/2003 | Echigo et al. | 709/103 |
| 2004/0170321 | A1* | 9/2004 | Gong et al. | 382/173 |
| 2005/0272411 | A1* | 12/2005 | Hashimoto et al. | 455/414.1 |
| 2007/0116433 | A1* | 5/2007 | Manico et al. | 386/95 |
| 2008/0226263 | A1* | 9/2008 | Iwase et al. | 386/124 |
| 2009/0022472 | A1* | 1/2009 | Bronstein et al. | 386/52 |
| 2009/0025039 | A1* | 1/2009 | Bronstein et al. | 725/60 |
| 2009/0148133 | A1* | 6/2009 | Nomura et al. | 386/124 |

FOREIGN PATENT DOCUMENTS

| | | |
|---|---|---|
| JP | 2002-16903 | 1/2002 |
| JP | 2002-354406 | 12/2002 |
| JP | 2005-102058 | 4/2005 |
| JP | 2007-281856 | 10/2007 |
| WO | 2007/145281 A1 | 12/2007 |

OTHER PUBLICATIONS

Notification of Reason for Refusal of Patent Application No. 2009-104428; dated Jan. 15, 2013.

* cited by examiner

*Primary Examiner* — Thai Tran
*Assistant Examiner* — Stephen Smith
(74) *Attorney, Agent, or Firm* — Staas & Halsey LLP

(57) ABSTRACT

A playback apparatus that divides the content into scenes; specifies a scene played back after a fast-forward operation or a rewind; calculates a first feature value of the scene specified by the specifying unit; divides content different from the video content into scenes and calculates second feature values, each of which corresponds to one of the scenes obtained by the second feature-value calculation unit; compares the first feature value with the second feature values and extracts a scene whose second feature value differs from the first feature value by a predetermined threshold or less; and outputs the scene extracted by the extraction unit.

8 Claims, 18 Drawing Sheets

FIG. 5

| | WORD a | WORD b | WORD c | WORD d | WORD e | WORD f | ... |
|---|---|---|---|---|---|---|---|
| CONTENT A | 0 | 0 | 1 | 2 | 0 | 1 | ... |
| CONTENT B | 0 | 2 | 0 | 1 | 1 | 0 | ... |

FIG. 7

| GENRE | CLUSTER | CLUSTER FEATURES | PREFERRED-SCENE FEATURES |
|---|---|---|---|
| DRAMA | DRAMA A | CLUSTER FEATURES | PREFERRED-SCENE FEATURES |
| DRAMA | DRAMA B | CLUSTER FEATURES | PREFERRED-SCENE FEATURES |
| DRAMA | DRAMA C | CLUSTER FEATURES | PREFERRED-SCENE FEATURES |
| SPORT | SPORT A | CLUSTER FEATURES | PREFERRED-SCENE FEATURES |
| SPORT | SPORT B | CLUSTER FEATURES | PREFERRED-SCENE FEATURES |

．
．
．

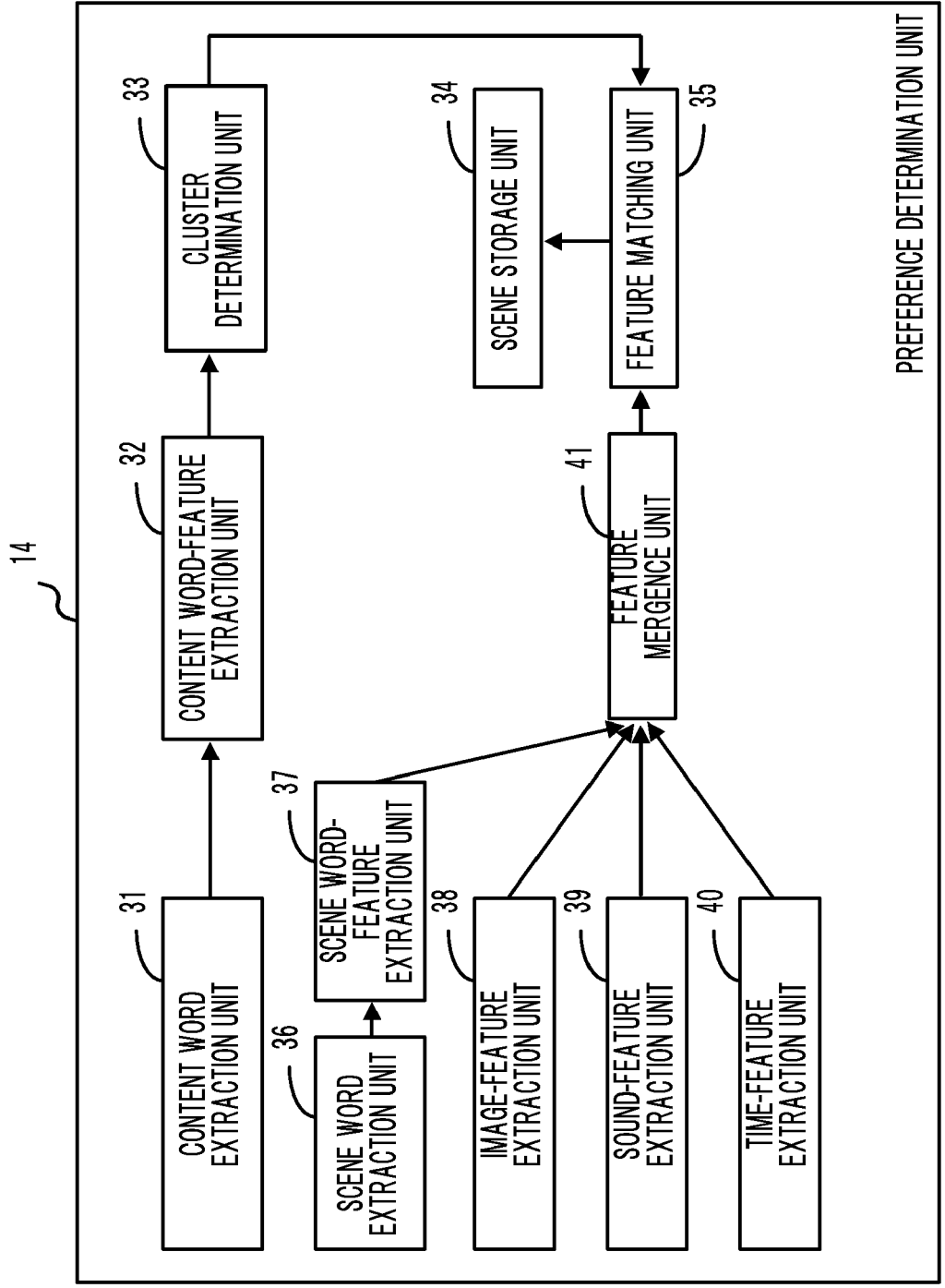

US 8,406,606 B2

PLAYBACK APPARATUS AND PLAYBACK METHOD

CROSS-REFERENCE TO RELATED APPLICATIONS

This application is based upon and claims the benefit of priority of the prior Japanese Patent Application No. 2009-104428, filed on Apr. 22, 2009, the entire contents of which are incorporated herein by reference.

FIELD

These embodiments relate to a playback apparatus and a playback method for playing back video content.

BACKGROUND

There is a method for automatically selecting content that matches the preference of a user or for automatically recording a program automatically selected from among recorded video content. Recording and/or playback apparatuses acquire an electronic program guide (EPG), search for programs that have keywords in the title or summary, and present them.

Moreover, there has been provided a technology to automatically determine which portion of content should be used as index information in a case where an image of a predetermined scene of the content is displayed as index information. For example, there has been provided a method for determining portions of content played back at a normal speed as highlights of the content using information indicating portions of the content where a user performs a fast-forward or rewind operation and information indicating the portions of the content played back at a normal speed (for example, Japanese Unexamined Patent Application Publication No. 2002-16903).

SUMMARY

According to an aspect of the embodiment, a playback apparatus for playing back video content.

A dividing unit that divides the video content into scenes.

A specifying unit that specifies a scene played back after a fast-forward operation or a rewind operation is instructed by referring to a recording unit in which an instruction for operation performed while the content, which has been divided into the scenes, is being played back and a scene being played back when the instruction is received are related to each other and recorded.

A first feature-value calculation unit that calculates a first feature value of the scene specified by the specifying unit.

A second feature-value calculation unit that divides content different from the video content into scenes and calculates second feature values, each of which corresponds to one of the scenes obtained by the second feature-value calculation unit.

An extraction unit that compares the first feature value with the second feature values and extracts a scene whose second feature value differs from the first feature value by a predetermined threshold or less.

An output unit that outputs the scene extracted by the extraction unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram showing an example of word features.

FIG. 7 is a diagram showing the structure of preference data stored in a preference storage unit.

FIG. 8 is a block diagram of a preference determination unit.

DESCRIPTION OF EMBODIMENTS

An embodiment will be specifically described with reference to the drawings.

Figure 1:
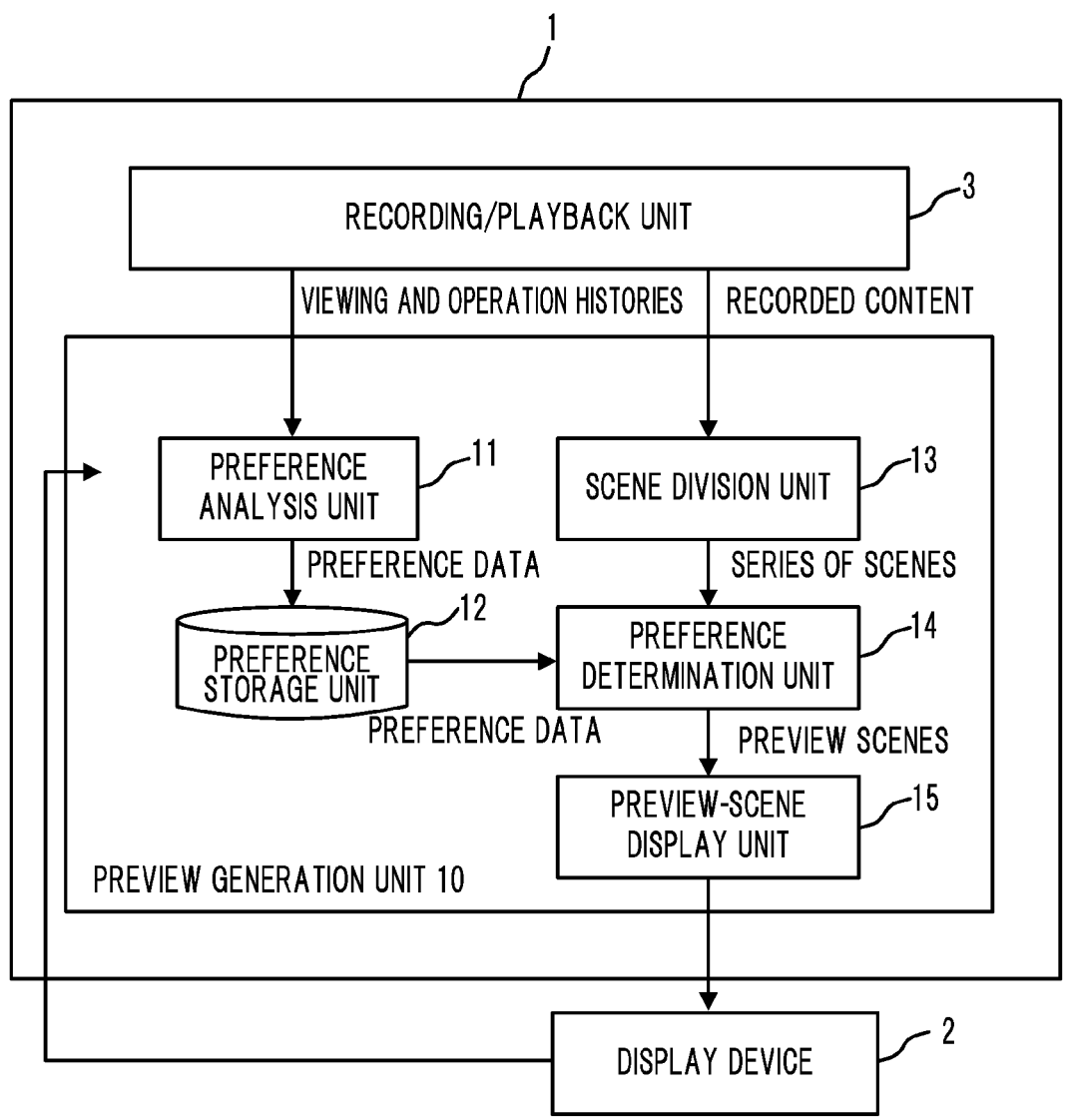
FIG. 1 is a block diagram of a recording and/or playback apparatus according to an embodiment.

FIG. 1 is a block diagram of a recording and/or playback apparatus according to this embodiment. A recording and/or playback apparatus 1 shown in FIG. 1 includes a recording and/or playback unit 3 and a preview generation unit 10. The recording and/or playback apparatus 1 is connected to a display device 2.

The recording and/or playback unit 3 records content such as broadcasted television programs, and plays back recorded content.

The preview generation unit 10 includes a preference analysis unit 11, a preference storage unit 12, a scene division unit 13, a preference determination unit 14, and a preview-scene display unit 15. The preview generation unit 10 extracts a scene that matches the preference of a user from content recorded by the recording and/or playback unit 3, and generates a preview.

The display device 2 displays content played back or to be recorded by the recording and/or playback unit 3, a scene that has matched the preference of a user and has been extracted by the preview generation unit 10, or representative images of extracted scenes.

In the following description, scenes are sections obtained by dividing content.

The preference analysis unit 11 included in the preview generation unit 10 generates preference data of a user from a content viewing history or an operation history of the user. The preference storage unit 12 stores the preference data generated by the preference analysis unit 11.

The scene division unit 13 divides content recorded by the recording and/or playback unit 3 into scenes. To obtain scenes by dividing content, for example, a cut-detection method is utilized. In the cut-detection method, images of adjacent frames are sequentially compared and a frame at which the image significantly changes from the previous frame is extracted as a cut. Instead of the cut-detection method, a method for detecting the change of subject in a video using information regarding captions, a method for roughly dividing content into scenes by considering repetition or seriality of images of cuts, or the like may be used.

The preference determination unit 14 utilizes the preference data stored in the preference storage unit 12 and extracts a scene that matches the preference of a user from a group of scenes obtained by the scene division unit 13 as a result of content division.

The preview-scene display unit 15 displays representative images of scenes that have matched the preference of a user and have been extracted by the preference determination unit 14, on the display device 2.

The preference analysis unit 11 determines that a scene selected and played back by a user from among representative images displayed on the display device 2 is a scene that matches the user's preference, and updates the preference data stored in the preference storage unit 12.

Figure 2A:
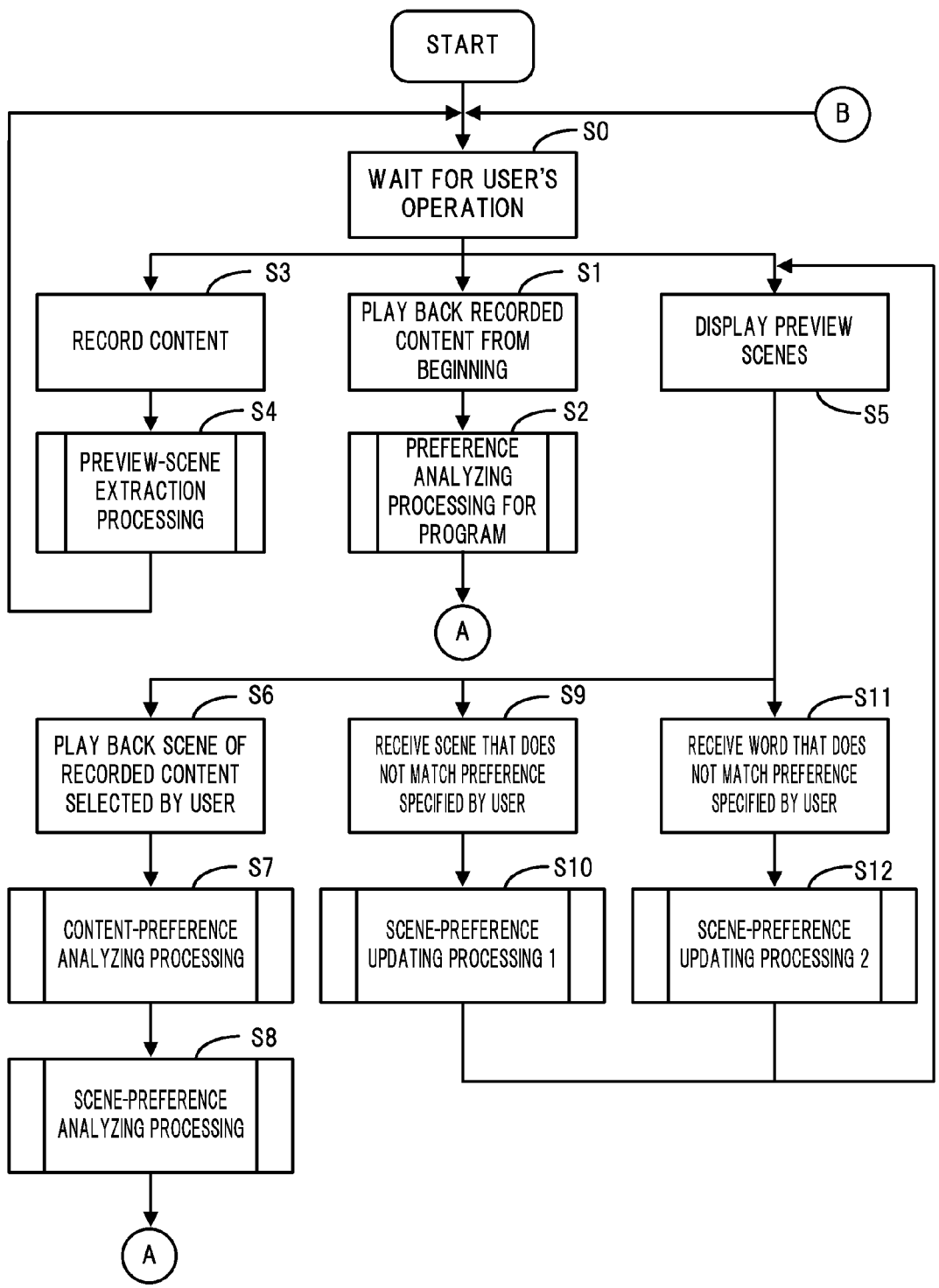
FIG. 2A is a flowchart showing a part of the entire procedure of processing in the recording and/or playback apparatus according to the embodiment.
Figure 2B:
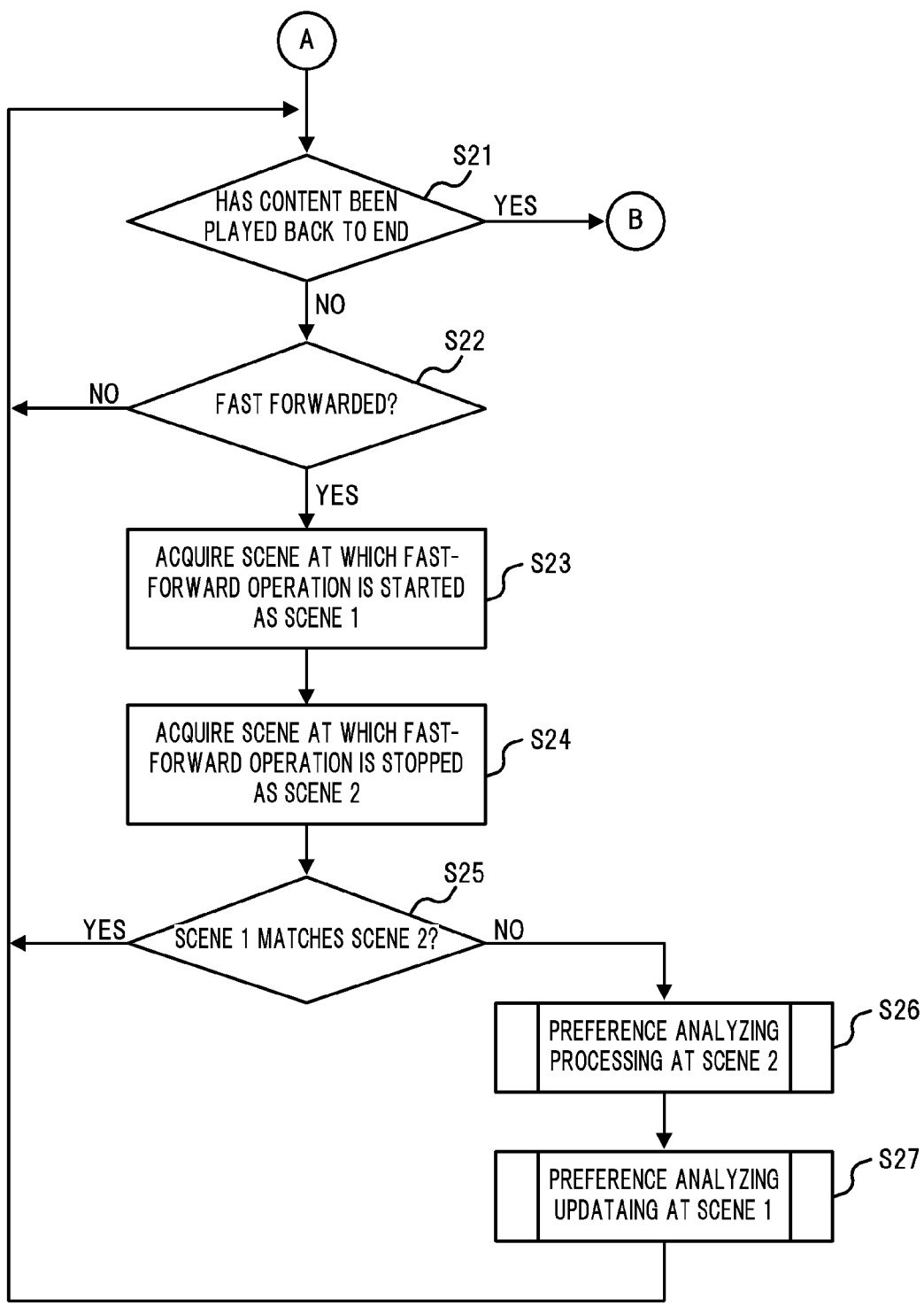
FIG. 2B is a flowchart showing the remaining part of the entire procedure of processing in the recording and/or playback apparatus according to the embodiment.

FIGS. 2A and 2B show a flowchart showing the entire procedure of processing for extracting scenes that match the preference of a user in the recording and/or playback apparatus 1 according to this embodiment.

In step S0, when in the state of waiting for a user's operation, the recording and/or playback apparatus 1 accepts one of three operations: recording of content, playback of content, and display of preview scenes.

If the user's operation is recording of content, the recording and/or playback unit 3 newly records content in step S3. Then, in step S4, the scene division unit 13 and the preference determination unit 14 perform processing for extracting preview scenes (hereinafter referred to as preview-scene extraction processing). In preview-scene extraction processing, scenes that match the user's preference are extracted as preview scenes from scenes obtained by dividing the content newly recorded in step S3. The preview-scene extraction processing will be specifically described with reference to FIGS. 8 to 9C. After preview scenes are extracted, the procedure proceeds to step S0. The recording and/or playback apparatus 1 returns to the state of waiting for the user's operation again.

If the user's operation is playback of content, the recording and/or playback unit 3 plays back recorded content from the beginning in step S1. In step S2, the preference analysis unit 11 performs processing for analyzing content preference (hereinafter referred to as content-preference analyzing processing). Content-preference analyzing processing performs clustering on the basis of feature values of content. Content-preference analyzing processing will be specifically described with reference to FIGS. 3 and 4.

In step S2, after the content-preference analyzing processing is performed, the procedure proceeds to step S21 shown in FIG. 2B. In step S21, the recording and/or playback unit 3 determines whether the content has been played back to the end. If the recording and/or playback unit 3 determines that the content has not been played back to the end, the recording and/or playback unit 3 determines, in step S22, whether the user has performed a fast-forward operation. If the recording and/or playback unit 3 determines that the user has not performed the fast-forward operation, the procedure returns to step S21.

In step S22, if the recording and/or playback unit 3 determines that the user has performed the fast-forward operation, the procedure proceeds to step S23. In step S23, the preference analysis unit 11 acquires the scene at which the user started the fast-forward operation. In step S24, the preference analysis unit 11 acquires the scene at which the user stopped the fast-forward operation.

In step S25, the preference analysis unit 11 determines whether the scenes at which the user started and stopped the fast-forward operation match. If the preference analysis unit 11 determines that these scenes match, the procedure returns to step S21.

If the preference analysis unit 11 determines that these scenes are different, the procedure proceeds to step S26. In step S26, the preference analysis unit 11 performs processing for analyzing scene preference (hereinafter referred to as scene-preference analyzing processing) on the scene at which the user stopped the fast-forward operation. In scene-preference analyzing processing, feature values of a scene determined to be a scene that matches the user's preference on the basis of operations performed to the recorder and/or playback apparatus 1 by the user are used to update the preference data stored in the preference storage unit 12. Scene-preference analyzing processing will be specifically described with reference to FIG. 6.

In step S27, the preference analysis unit 11 performs processing for updating scene preference (hereinafter referred to as scene-preference updating processing) on the scene at which the user started the fast-forward operation. In scene-preference updating processing, feature values of a scene determined to be a scene that does not match the preference of a user on the basis of operations performed to the recorder and/or playback apparatus 1 by the user are used to update the preference data stored in the preference storage unit 12. Scene-preference updating processing will be specifically described with reference to FIG. 12. After scene-preference updating processing is performed, the procedure returns to step S21.

In step S21, if the recording and/or playback unit 3 determines that the content is played back to the end, the procedure proceeds to step S0 shown in FIG. 2A. The recording and/or playback apparatus 1 returns to the state of waiting for the user's operation again.

If the user's operation is display of preview scenes, the preview-scene display unit 15 displays extracted preview scenes in step S5. The procedure proceeds to step S6, S9, or S11 in accordance with an operation performed for the displayed preview scenes by the user to the recorder and/or playback apparatus 1.

In step S6, the recording and/or playback unit 3 plays back a scene that the user selected from among the displayed preview scenes and for which the user performed a playback operation. In step S7, the preference analysis unit 11 performs content-preference analyzing processing, and, in step S8, performs scene-preference analyzing processing on the played back scene. Then, the procedure proceeds to step S21 shown in FIG. 2B. The processing in and after step S21 shown in FIG. 2B is as described above.

In step S9, the recording and/or playback unit 3 receives a scene that the user specified because the scene does not match the user's preference, from among the displayed preview scenes. In step S10, the preference analysis unit 11 performs scene-preference updating processing 1 for updating scene preference. The scene-preference updating processing 1 in step S10 is similar to processing performed in step S27. After the scene-preference updating processing 1 is performed, the procedure returns to step S5.

In step S11, the recording and/or playback unit 3 receives a word that the user specified because the word does not match the user's preference, from among words displayed with the displayed preview scenes. In step S12, the preference analysis unit 11 performs scene-preference updating processing 2 for updating scene preference. In the scene-preference updating processing 2 in step S12, features of the word determined to be a word that does not match the user's preference from among words relating to an EPG, captions, and the like will not be utilized in preview-scene extraction. The scene-preference updating processing 2 will be specifically described with reference to FIG. 13.

As described above, in the recording and/or playback apparatus 1 according to this embodiment, the preference analysis unit 11 generates preference data updated in accordance with the user's preference. The preference determination unit 14 utilizes the preference data generated by the preference analysis unit 11 and extracts a scene that matches the user's preference from among recorded content. When the user inputs information as to whether the extracted scene matches the user's preference, the preference analysis unit 11 updates the preference data using the information input by the user and changes the preference data in accordance with the user's preference. In the following, the preference analysis unit 11 and the preference determination unit 14 will be specifically described.

Figure 3:
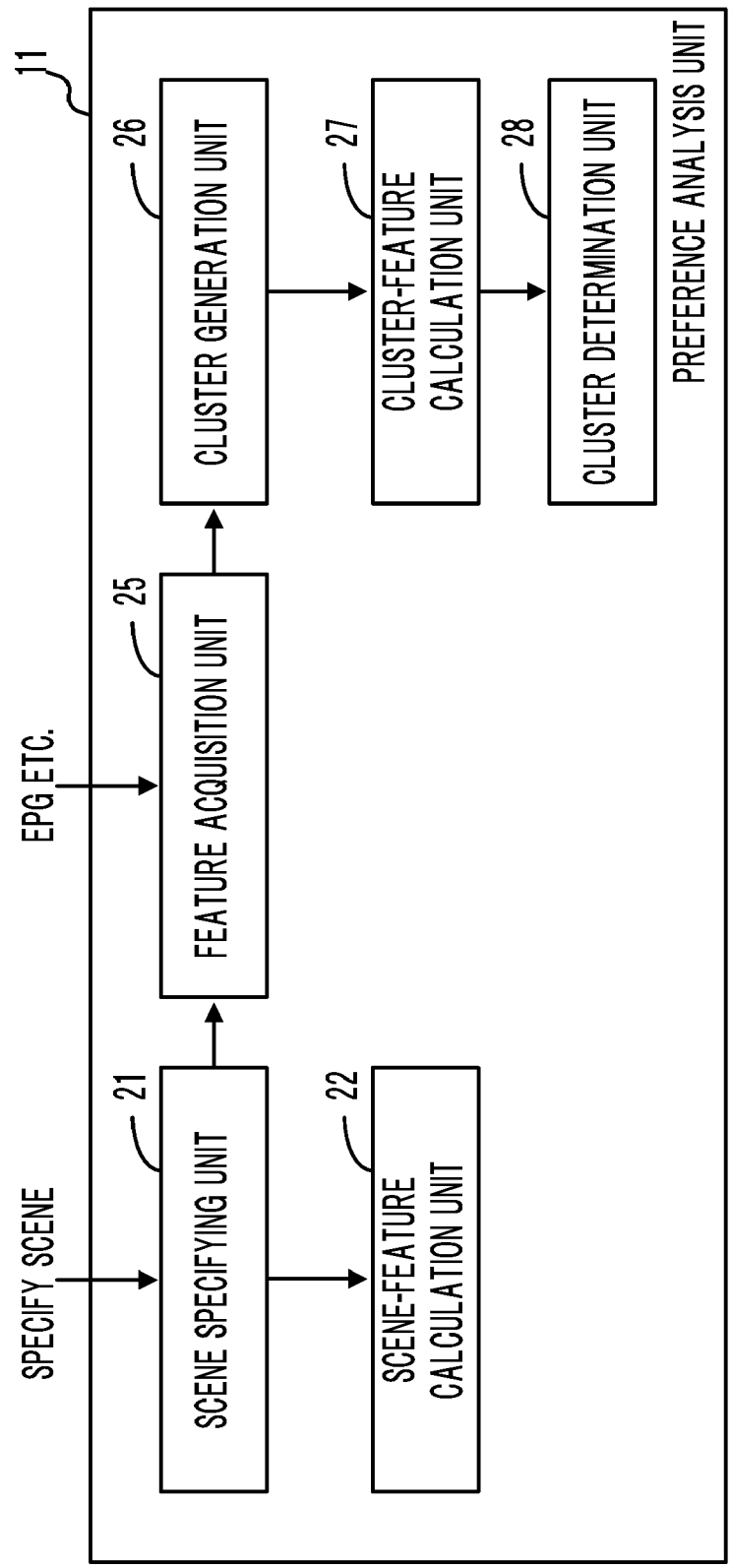
FIG. 3 is a block diagram of a preference analysis unit.

FIG. 3 is a block diagram of the preference analysis unit 11. The preference analysis unit 11 includes a scene specifying unit 21, a scene-feature calculation unit 22, a feature acquisition unit 25, a cluster generation unit 26, a cluster-feature calculation unit 27, and a cluster determination unit 28.

The scene specifying unit 21 receives information regarding a scene specified by a user.

The feature acquisition unit 25 acquires word features of content including the scene specified by the scene specifying unit 21 from among word features of content stored in the preference storage unit 12. Word features will be specifically described with reference to FIG. 5.

The cluster generation unit 26 utilizes word features acquired by the feature acquisition unit 25 and classifies a content group including pieces of content in accordance with the preference of a user. A classification method may be used in which, for example, information such as an EPG is acquired and the content group is classified in accordance with content genres included in the acquired information. For each genre, word features of content included in the genre are clustered.

Clustering may be hierarchical clustering such as a nearest neighbor method or may be non-hierarchical clustering such as a K-means method.

For each cluster generated by the cluster generation unit 26, the cluster-feature calculation unit 27 calculates word features representing features of the cluster. In general, for each cluster, a cluster-feature vector is obtained from the average of word-feature vectors included in the cluster.

The cluster determination unit 28 utilizes cluster-feature vectors obtained by the cluster-feature calculation unit 27 and determines which cluster content belongs to. In general, the cluster determination unit 28 compares word features of content with cluster features of clusters generated by the cluster generation unit 26, and determines that the content belongs to the cluster having cluster features that are the most similar to the word features of the content.

The scene-feature calculation unit 22 calculates features of a scene specified by the scene specifying unit 21. More specifically, the scene-feature calculation unit 22 acquires image features, sound features, time features, and the like regarding the scene in addition to word features extracted from information regarding captions. Details of image features, sound features, and time features will be described later. The word features, the image features, the sound features, and the time features are merged to obtain scene features. In mergence processing, features with a smaller variance are more highly weighted. Moreover, for each cluster generated by the cluster generation unit 26, the scene-feature calculation unit 22 calculates the average and a variance of scene features of all scenes that match the preference of a user and treats the average and variance as preferred-scene features. Preferred-scene features are related to a corresponding cluster and stored in the preference storage unit 12.

FIG. 7 is a diagram showing a data structure stored in the preference storage unit 12. As shown in FIG. 7, each genre is related to a cluster, cluster features, and preferred-scene features.

Figure 4:
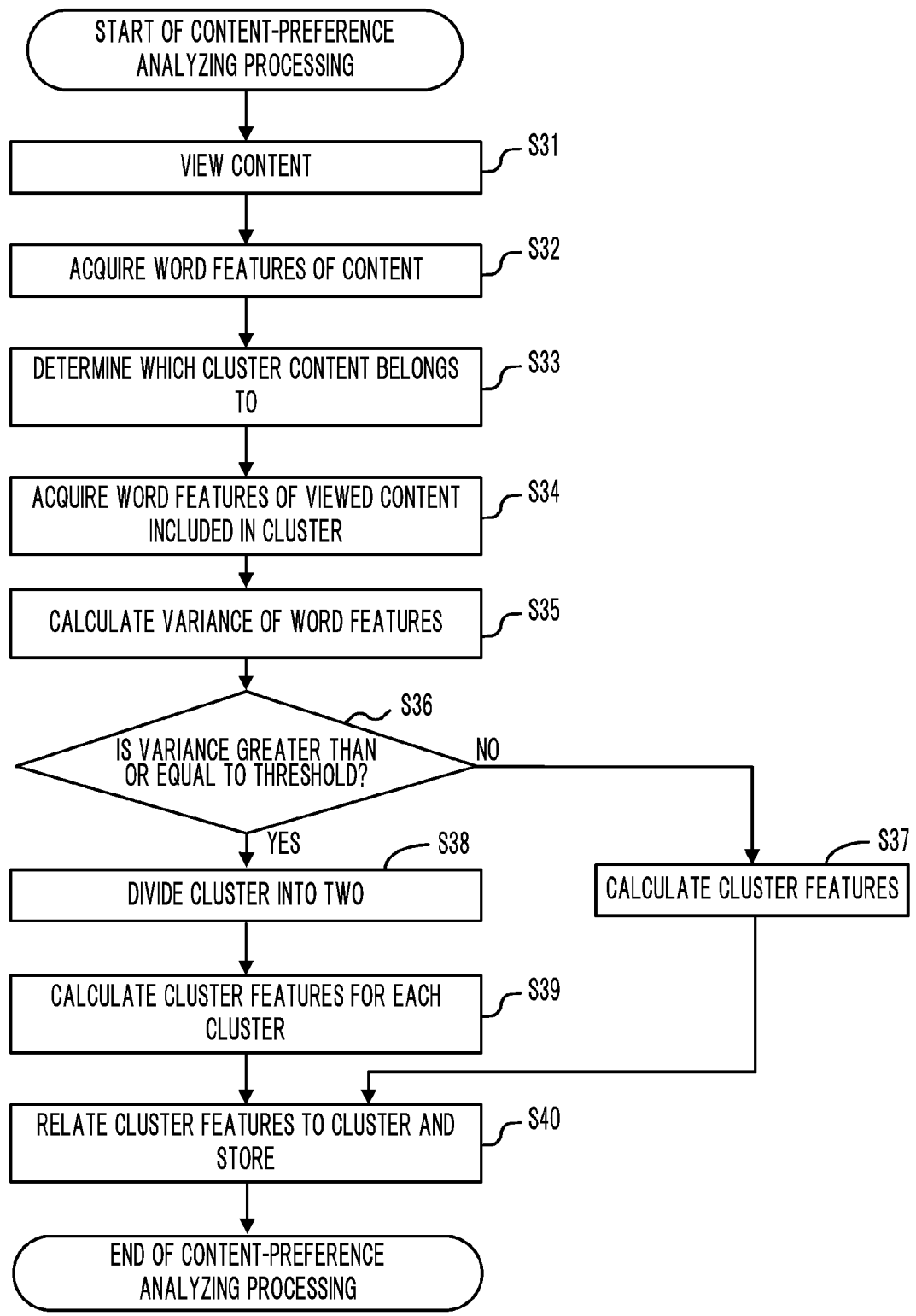
FIG. 4 is a flowchart showing processing for analyzing content preference in the preference analysis unit.

FIG. 4 is a flowchart showing content-preference analyzing processing in the preference analysis unit 11. If the recording and/or playback unit 3 plays back content from the beginning (in step S1 shown in FIG. 2A) or plays back a scene that a user has selected from among preview scenes (in step S6 shown in FIG. 2A), the preference analysis unit 11 starts processing shown in FIG. 4 only when the recording and/or playback unit 3 plays back the content for the first time.

First, in step S31, the recording and/or playback unit 3 plays back content (, and a user views the content). In step S32, the feature acquisition unit 25 acquires word features of the content being played back from the preference storage unit 12.

FIG. 5 shows an example of word features. The feature acquisition unit 25 extracts words necessary to analyze preference from program information acquired from an EPG attached to the content and the text of web pages related to the content and the like, and calculates word features using the extracted words. For example, a vector space model may be utilized as an example of word features. In a vector space model, a vector space is set by assigning axes to extracted words. A vector obtained by assigning the occurrence number of each word to a corresponding one of the axes is treated as a word-feature vector. When such feature vectors are each obtained for a corresponding one of pieces of content, the similarity between the pieces of content can be expressed by the distance between the feature vectors. Here, latent semantic indexing (LSI), which compresses the dimensions of the vector space, may be performed using a co-occurrence function regarding words.

In step S33, the cluster determination unit 28 determines which cluster the content being played back belongs to. For the genre indicated by genre information included in the EPG or the like of the content, the cluster determination unit 28 compares cluster features of all clusters for the genre with the word features acquired in step S32. The cluster determination unit 28 determines that the content being played back belongs to the cluster having cluster features that are the most similar to the word features of the content acquired in step S32.

In step S34, the cluster-feature calculation unit 27 acquires word features of the cluster determined in step S33 to be the cluster to which the content belongs, from the preference storage unit 12. Here, the cluster-feature calculation unit 27 acquires word features of all pieces of content that were played back in the past and are included in the cluster to which the content being played back belongs, from among pieces of content recorded in the recording and/or playback apparatus 1.

In step S35, the cluster-feature calculation unit 27 adds the word features acquired in step S34 and the word features of the content being played back acquired in step S32, and calculates a variance.

In step S36, the cluster determination unit 28 determines whether the variance obtained in step S35 is greater than or equal to a predetermined threshold. If the variance is greater than or equal to the predetermined threshold, the cluster generation unit 26 determines that the distribution of the word features within the cluster is wide and divides the cluster into two in step S38. Then, in step S39, the cluster-feature calculation unit 27 calculates cluster features again for each of the two clusters obtained by division. The procedure proceeds to step S40.

In step S36, if it is determined that the variance is smaller than the predetermined threshold, the procedure proceeds to step S37. The cluster-feature calculation unit 27 calculates cluster features for the cluster for which the variance of the word features was obtained in step S35. The procedure proceeds to step S40.

In step S40, the cluster determination unit 28 relates the cluster features obtained by the cluster-feature calculation unit 27 to the corresponding cluster, and stores the cluster features in the preference storage unit 12. Content-preference analyzing processing ends.

Content-preference analyzing processing shown in FIG. 4 updates the preference data every time new content is played back (in steps S1 and S6 shown in FIG. 2A). Thus, the recording and/or playback apparatus 1 according to this embodiment can have the latest preference data updated in accordance with the preference of a user.

The preference analysis unit 11 utilizes a result of content clustering obtained through processing shown in FIG. 4 and analyzes scenes that match the preference of a user in accordance with what scenes the user views (or operates to play back) while the content is being played back by the recording and/or playback unit 3.

Figure 6:
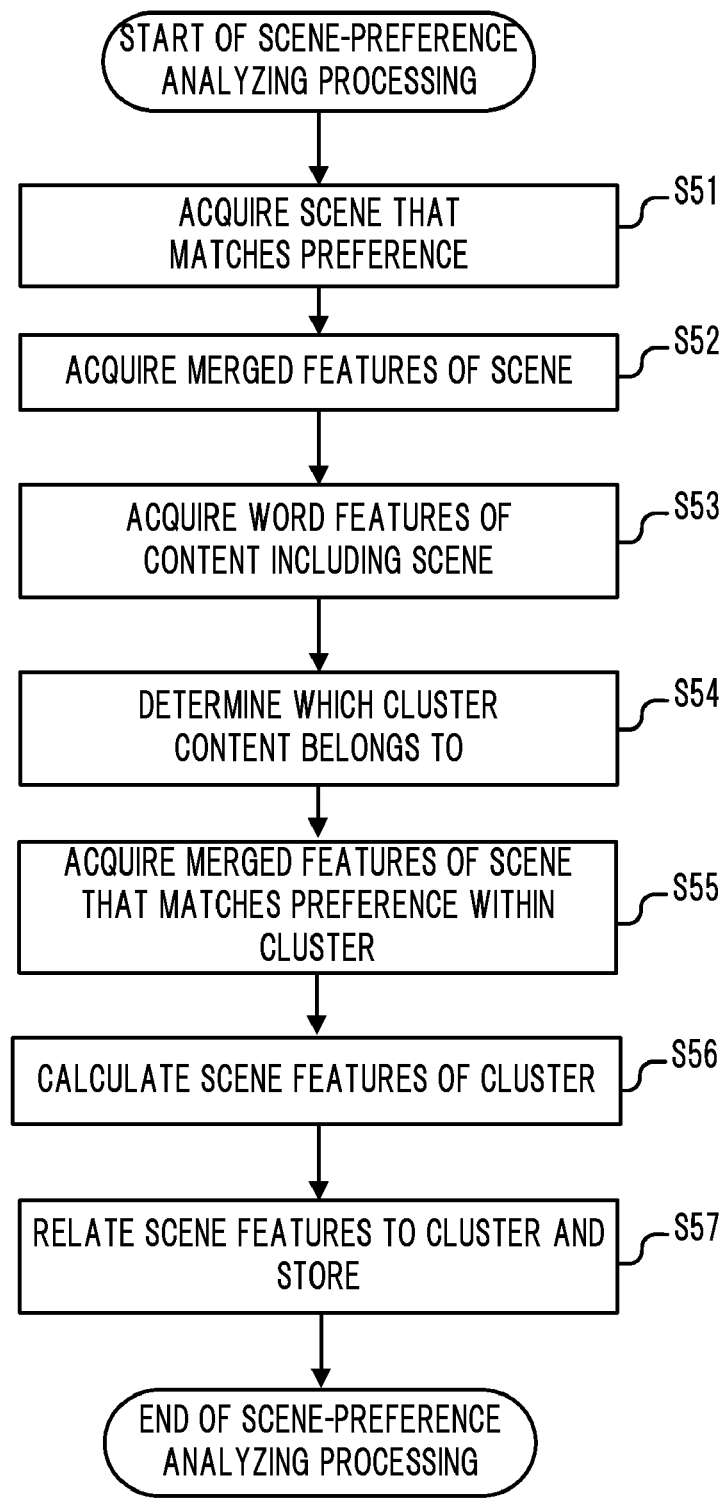
FIG. 6 is a flowchart showing processing for analyzing scene preference in the preference analysis unit.

FIG. 6 is a flowchart showing scene-preference analyzing processing in the preference analysis unit 11. The preference analysis unit 11 executes processing shown in FIG. 6 when receiving information indicating that a scene has been determined to match the preference of a user or a scene that the user has specified because the scene matches the user's preference.

First, in step S51, the scene specifying unit 21 acquires the scene that was determined to be a scene that matches the preference of a user or the scene that the user specified because the scene matches the user's preference. In step S52, the scene-feature calculation unit 22 calculates scene features of the scene acquired in step S51. The scene features are calculated by merging word features, image features, sound features, and time features of the scene.

In step S53, the cluster-feature calculation unit 27 acquires word features of content including the specified scene acquired in step S51, from the preference storage unit 12. In step S54, the cluster determination unit 28 determines which cluster the content including the specified scene belongs to. In step S55, the scene-feature calculation unit 22 acquires scene features of all scenes that match the user's preference and are included in the cluster determined in step S54, from the preference storage unit 12.

In step S56, the scene-feature calculation unit 22 calculates again preferred-scene features of the cluster to which the content including the specified scene belongs. More specifically, the scene-feature calculation unit 22 obtains the average of the scene features of the specified scene acquired in step S52 and the scene features acquired in step S55, and treats the average as new preferred-scene features of the cluster.

In step S57, the scene-feature calculation unit 22 relates the preferred-scene features obtained by recalculation in step S56 to the corresponding cluster, and stores the preferred-scene features in the preference storage unit 12. Scene-preference analyzing processing ends.

As described above, every time the user specifies a scene in the preview scenes (in step S6 shown in FIG. 2A) or the user stops the fast-forward operation and starts playback (in step S24 shown in FIG. 2B), the preference data is updated in accordance with features of the specified scene or features of the scene played back after the fast-forward operation is stopped. Thus, the recording and/or playback apparatus 1 according to this embodiment can have the latest preference data updated in accordance with scenes that match the preference of a user.

Here, a method for specifying scenes that match the preference of a user is not limited to cases shown in FIGS. 2A and 2B: a case where the user plays back content from the beginning and a case where the user starts playing back content by stopping a fast-forward operation. In a case where a user stops a fast-forward operation and starts playing back content by operating the recording and/or playback apparatus 1 or in a case where a user plays back a scene by locating the beginning or by selecting the scene from a playback menu, scenes played back after such an operation is performed are determined to be scenes that match the user's preference. Processing shown in FIG. 6 is performed to update the preference data of the user.

The preference determination unit 14 utilizes the preference data generated by the preference analysis unit 11 using the above-described method and extracts preview scenes that match the user's preference from among recorded content. Next, the preference determination unit 14 will be described.

FIG. 8 is a block diagram of the preference determination unit 14. The preference determination unit 14 includes a content word extraction unit 31, a content word-feature extraction unit 32, a cluster determination unit 33, a scene storage unit 34, a feature matching unit 35, a scene word extraction unit 36, a scene word-feature extraction unit 37, an image-feature extraction unit 38, a sound-feature extraction unit 39, a time-feature extraction unit 40, and a feature mergence unit 41.

The content word extraction unit 31 receives program information obtained from the text of web pages and the like relating to an EPG and content obtained by searching for a program title. The content word extraction unit 31 extracts words necessary to perform preference determination from the received program information. The content word-feature extraction unit 32 calculates word features from the words extracted by the content word extraction unit 31. A method for calculating word features has been described with reference to FIG. 5 in the above.

The cluster determination unit 33 performs similar processing to the cluster determination unit 28 of the preference analysis unit 11 shown in FIG. 3.

The scene word extraction unit 36 extracts words necessary to perform preference determination from information regarding captions and the like of images of a scene. The scene word-feature extraction unit 37 calculates word features from the words extracted by the scene word extraction unit 36. A method for calculating word features in the scene word-feature extraction unit 37 is similar to that performed in the content word-feature extraction unit 32.

The image-feature extraction unit 38 extracts image features from images of a scene. Examples of image features to be extracted include color histogram features regarding the ratio between colors of the entire images, color layout features regarding a color distribution in terms of layout, representative-color features regarding the color whose proportion in images is the highest, and edge-distribution features regarding the edge distribution of images. A method for extracting these features is known to the public and thus the description thereof will be omitted.

The sound-feature extraction unit 39 extracts sound features from sound data of a scene. Examples of sound features to be extracted include power features and spectrum envelope features. A method for extracting sound features is also known to the public and thus the description thereof will be omitted.

The time-feature extraction unit 40 extracts the temporal location of a scene within content. The temporal location to be extracted may be obtained by utilizing an elapsed time from the beginning of content or the proportion of the time period from the beginning of the content to the beginning of the scene in the entire time period of the content.

The feature mergence unit 41 acquires various features extracted by the scene word-feature extraction unit 37, the image-feature extraction unit 38, the sound-feature extraction unit 39, and the time-feature extraction unit 40, merges the various features, and calculates scene features.

The feature matching unit 35 compares scene features obtained by the feature mergence unit 41 with the preferred-scene features obtained from the preference storage unit 12 and related to a cluster to which content including a scene, which is a processing target, belongs. Then, if the distance between the scene features of the scene, which is the processing target, and the preferred-scene features obtained from the preference storage unit 12 and related to the cluster is less than or equal to a predetermined threshold, the feature matching unit 35 extracts the scene, which is the processing target, as a preview scene.

The scene storage unit 34 relates a scene extracted as a preview scene by the feature matching unit 35 to the features obtained by the feature mergence unit 41, and stores the scene and the features.

Figure 9A:
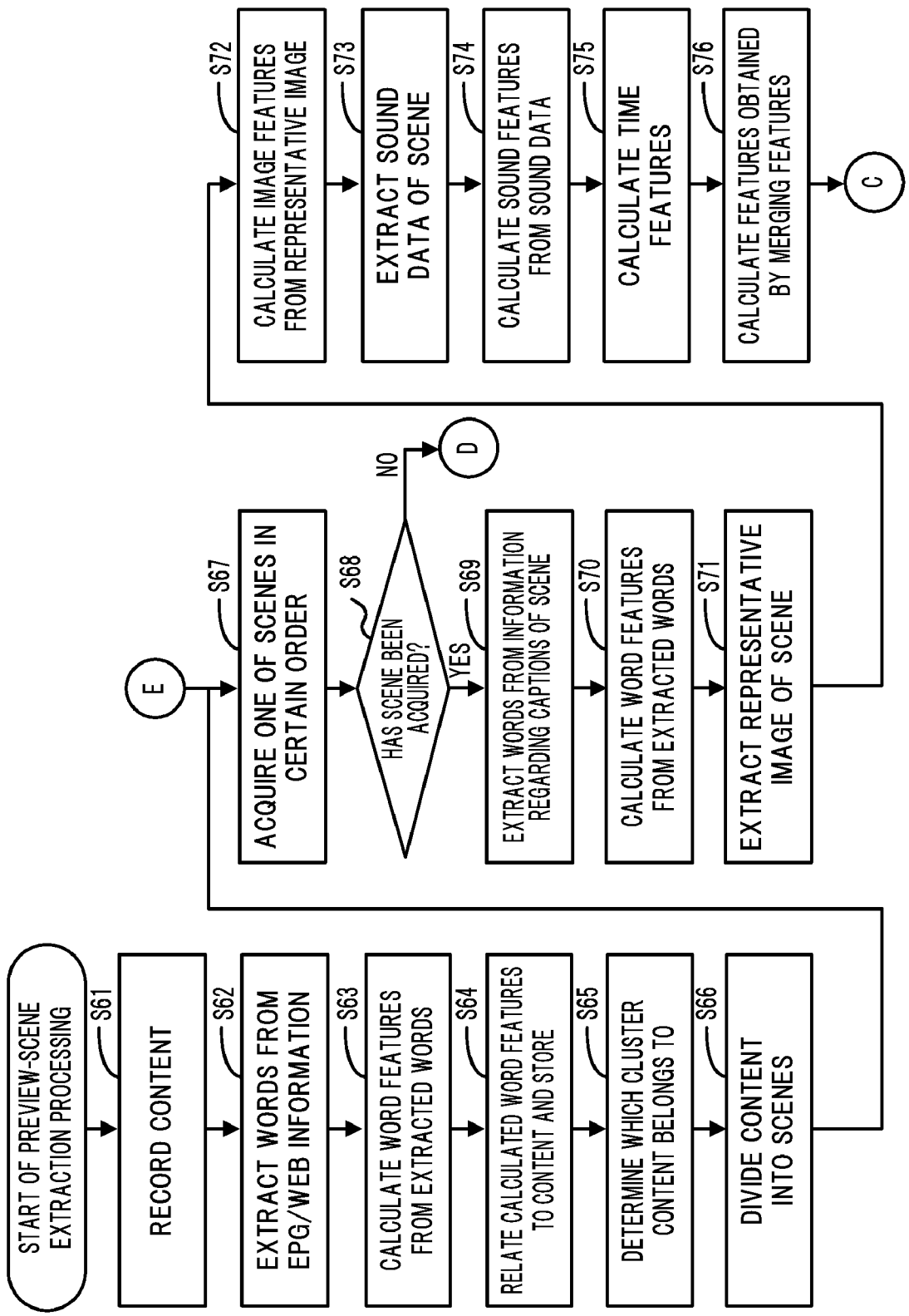
FIGS. 9A and 9B and 9C are flowcharts showing a part of processing for determining content preference in the preference determination unit.
Figure 9B:
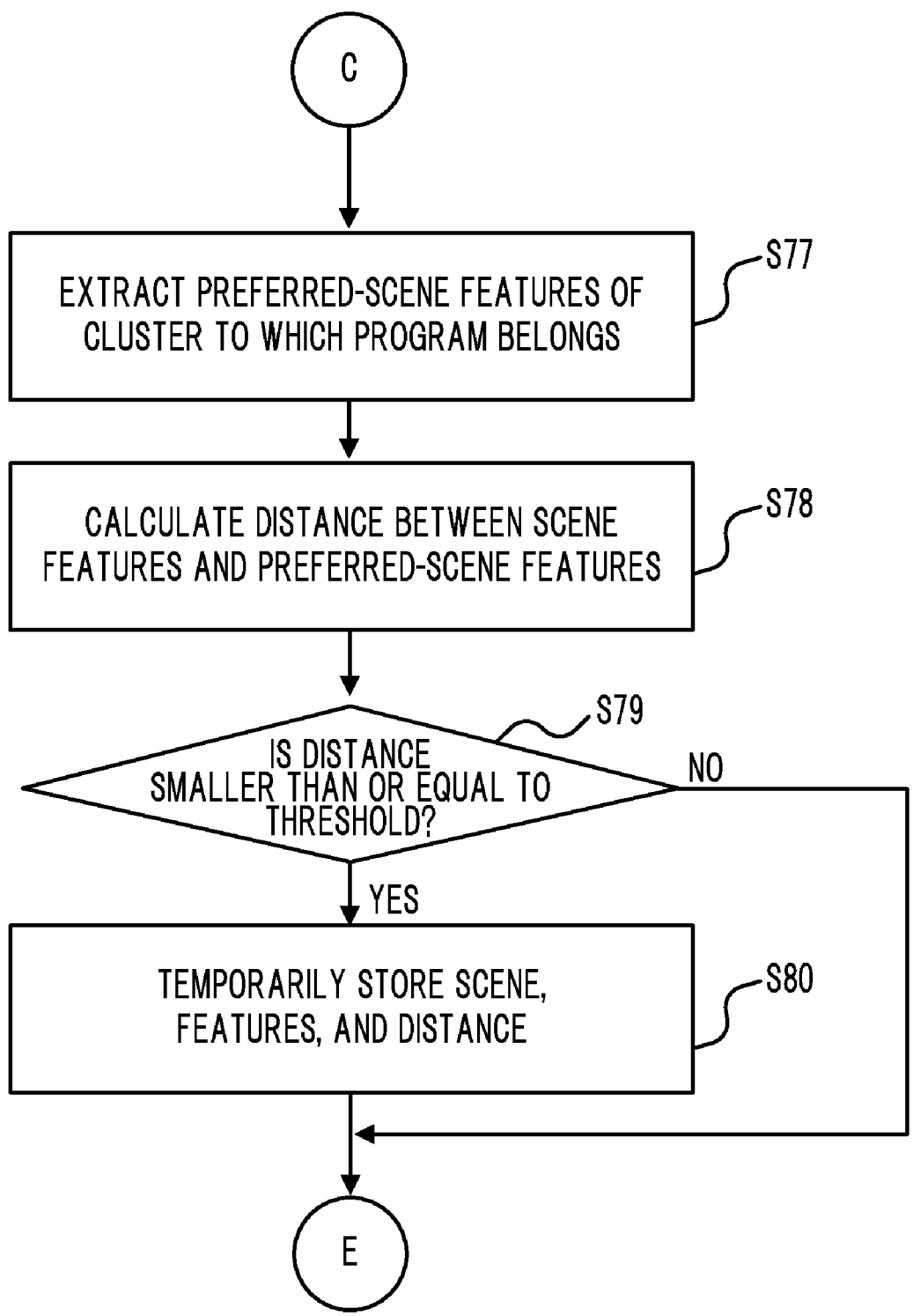
Figure 9C:
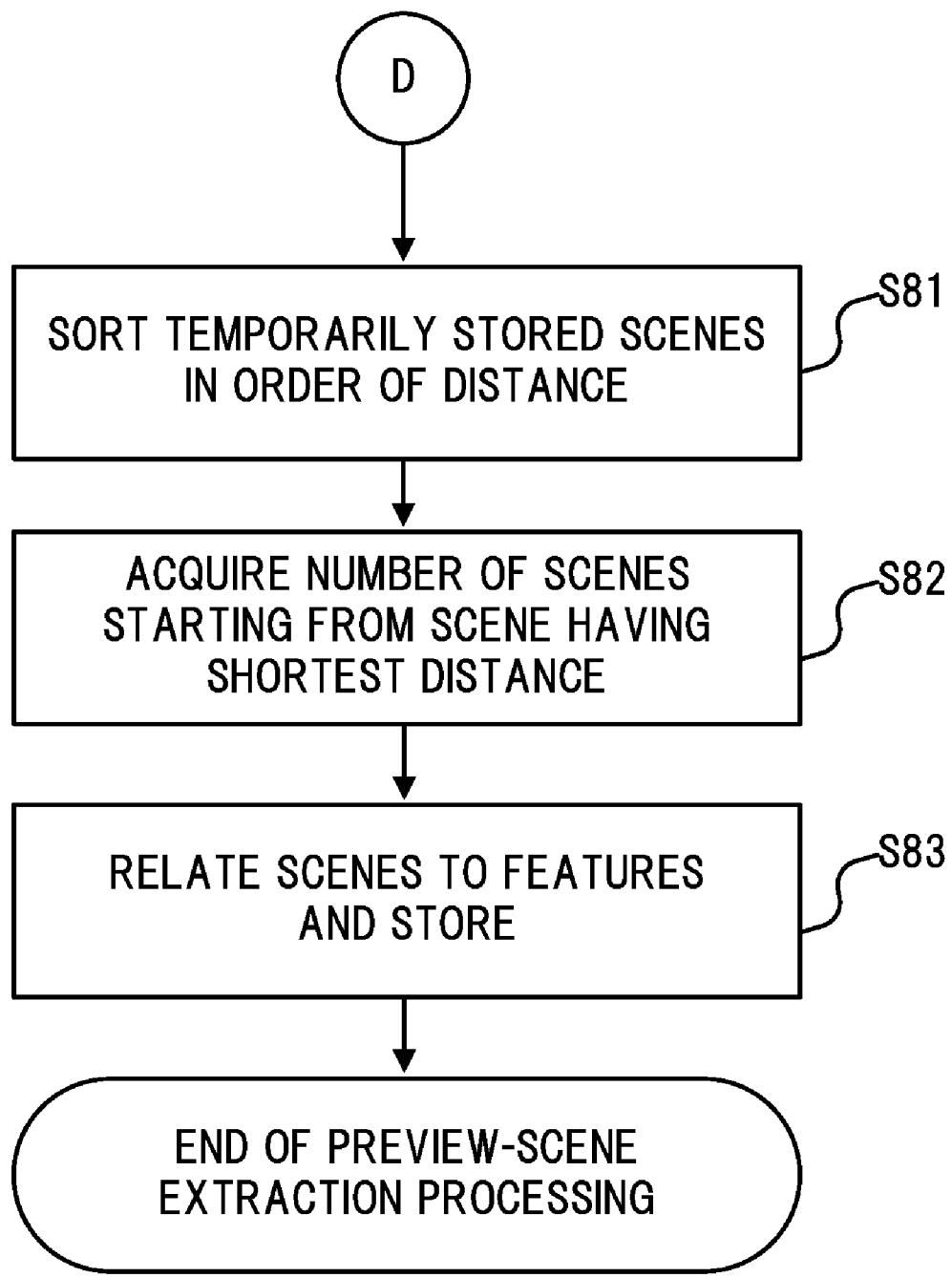

FIGS. 9A to 9C show a flowchart showing processing for determining content preference in the preference determination unit 14. If the recording and/or playback unit 3 newly records content (in step S3 shown in FIG. 2A), the preference determination unit 14 starts processing for extracting a preview scene shown in FIGS. 9A to 9C.

First, in step S61 shown in FIG. 9A, new recording of content is recognized when certain information is input to the content word extraction unit 31. In step S62, the content word extraction unit 31 extracts words from information such as an EPG, the text of web pages, and the like. In step S63, the content word-feature extraction unit 32 calculates word features from the words extracted in step S62. In step S64, the content word-feature extraction unit 32 relates the calculated word features to the content, and stores the word features and the content in the preference storage unit 12.

In step S65, the cluster determination unit 33 determines which cluster the content belongs to. A determination method is similar to that performed in step S33 shown in FIG. 4.

In steps S66 and S67, one of scenes obtained by dividing the content in the scene division unit 13 is acquired in a certain order. If a scene is acquired in step S68, the procedure proceeds to step S69.

In step S69, the scene word extraction unit 36 extracts necessary words from information regarding captions appearing within a period of the scene obtained in step S67. In step S70, the scene word-feature extraction unit 37 calculates word features from the words extracted in step S69.

In step S71, the image-feature extraction unit 38 extracts a representative image of the scene acquired in step S67. In this embodiment, the image of the first frame of a scene is extracted, but an image to be extracted is not limited thereto. For example, the frame located at the center of the period of the scene may be extracted, or a representative frame may be extracted from images belonging to the cluster that is one of clusters obtained by analyzing and clustering images of all frames and has the largest number of images. In step S72, the image-feature extraction unit 38 calculates image features of the representative image extracted in step S71.

In step S73, the sound-feature extraction unit 39 extracts sound data from the scene acquired in step S67. In this embodiment, sound data of the entire period of the scene is acquired, but sound data to be extracted is not limited thereto. For example, sound data of a predetermined period from the beginning of a scene may be extracted, or sound data of a predetermined period near the center of the period of a scene may be extracted. In step S74, the sound-feature extraction unit 39 calculates sound features from the sound data extracted in step S73.

In step S75, the time-feature extraction unit 40 calculates time features from the start time and end time of the scene acquired in step S67. As described above, a method for calculating time features in step S75 is an example.

In step S76, the feature mergence unit 41 calculates scene features by merging the word features, the image features, the sound features, and the time features calculated in steps S69 to S75. The procedure proceeds to step S77 shown in FIG. 9B.

In step S77 shown in FIG. 9B, the feature matching unit 35 extracts the preferred-scene features related to the cluster to which the content belongs, from the preference storage unit 12. In step S78, the feature matching unit 35 calculates the distance between the scene features calculated in step S76 and the preferred-scene features extracted in step S77. Then, in step S79, the feature matching unit 35 determines whether the distance calculated in step S78 is less than or equal to a predetermined threshold. When the distance exceeds the threshold, the procedure returns to step S67 shown in FIG. 9A and the above-described processing will be performed again on the next scene.

In step S79, if the feature matching unit 35 determines that the distance calculated in step S78 is less than or equal to the predetermined threshold, the procedure proceeds to step S80. In step S80, the scene storage unit 34 temporarily stores the scene acquired in step S67, the scene features calculated in steps S69 to S75, and the distance calculated in step S78. The procedure returns to step S67 shown in FIG. 9A.

Thereafter, processing in and after step S67 is repeated. For each of the scenes obtained by dividing the content, scene features are calculated. If the distance between the scene features and the preferred-scene features stored in the preference storage unit 12 is less than or equal to the predetermined threshold, the scene is temporarily stored as a possible preview scene.

If a scene is not acquired in step S68, it is determined that all the scenes have been processed. The procedure proceeds to step S81 shown in FIG. 9C.

In step S81 shown in FIG. 9C, the scene storage unit 34 sorts the temporarily stored scenes in order of distance. In step S82, the scene storage unit 34 acquires a predetermined number of scenes starting from the scene having the shortest distance as preview scenes. Then, in step S83, the scene storage unit 34 relates the predetermined number of scenes acquired in step S82 to the corresponding scene features and representative images, and stores the scenes, the scene features, and the representative images in the preference storage unit 12. The processing ends.

As described above, the preferred-scene features of each cluster stored in the preference storage unit 12 are compared with the features of scenes included in recorded content, and scenes having short distances between these features are extracted and stored in the preference storage unit 12. Scenes that match the preference of a user can be extracted as preview scenes by utilizing the preference data, which is updated in accordance with the user's preference and stored in the preference storage unit 12.

Figure 10:
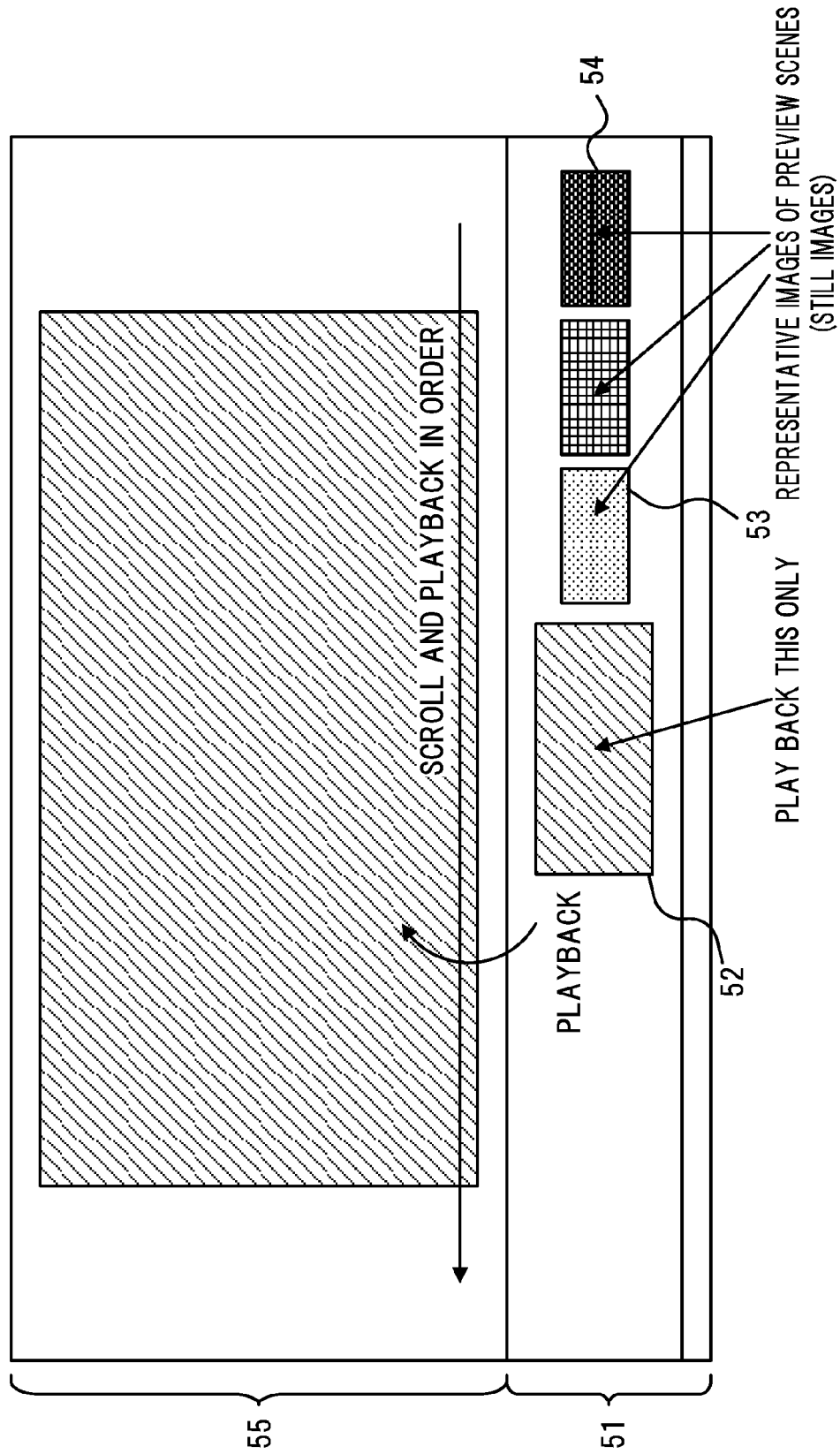
FIG. 10 shows an example of a display screen on which extracted preview scenes are displayed.

FIG. 10 is an example of a display screen on which extracted preview scenes are displayed.

In the display example shown in FIG. 10, representative images of extracted preview scenes are aligned and displayed in a preview-scene display area 51. When a plurality of representative images are displayed, for example, the representative images are aligned in a temporal order.

A scene playback area 55 displays a preview scene being played back. In the example shown in FIG. 10, the scene playback area 55 displays the scene corresponding to a representative image 52 displayed at the center of the preview-scene display area 51.

The recording and/or playback apparatus 1 may be configured in such a manner that when playback of the scene ends, for example, images displayed in the preview-scene display area 51 are scrolled and the scene corresponding to a representative image next displayed at the center of the preview-scene display area 51 is played back in the scene playback area 55.

The recording and/or playback apparatus 1 may be configured to play back a representative image (or the scene corresponding to the representative image) specified by a user through the screen of the display device 2. For example, when a user specifies a representative image 54 in the preview-scene display area 51, representative images may be scrolled until the representative image 54 reaches the center of the preview-scene display area 51 and the scene corresponding to the representative image 54 may be played back in the scene playback area 55.

Furthermore, the recording and/or playback apparatus 1 may be configured in such a manner that when a user specifies the scene being played back in the scene playback area 55, the continuation of the scene is played back after playback of the preview scene.

Figure 11:
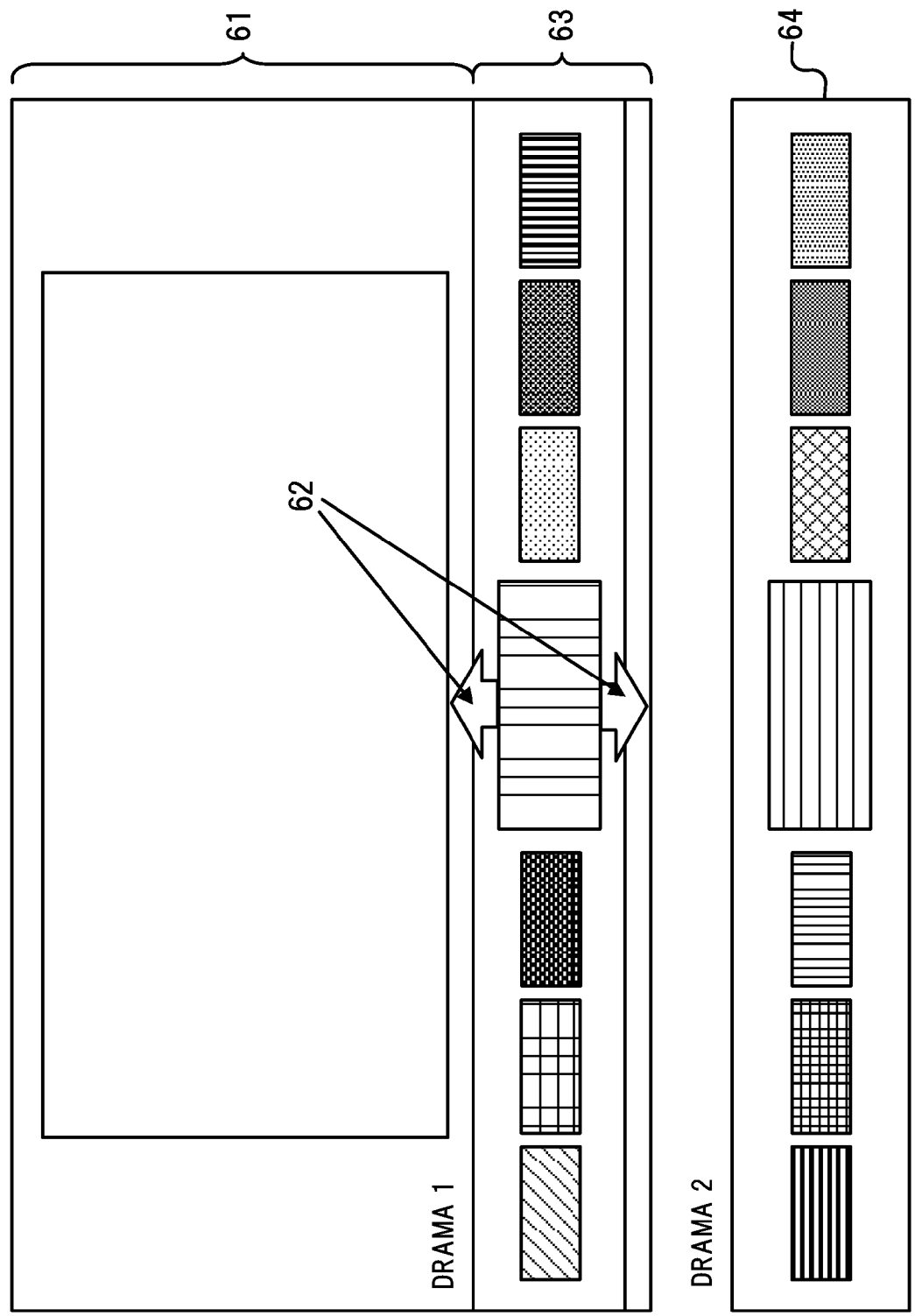
FIG. 11 shows another example of a display screen on which extracted preview scenes are displayed.

FIG. 11 is another example of a display screen on which extracted preview scenes are displayed. In the display example shown in FIG. 11, preview scenes of all recorded content included in a cluster are simultaneously displayed.

A preview-scene display area 63 displays representative images of preview scenes extracted from a group of pieces of content belonging to a cluster. Similarly to the example shown in FIG. 10, a scene playback area 61 displays the scene corresponding to the representative image displayed at the center of the preview-scene display area 63.

Representative images may be aligned from content to content, or may be sorted in order of predetermined features.

A cluster selector button 62 is displayed at the center of the preview-scene display area 63. When it is recognized that a user has pressed the cluster selector button 62 utilizing a pointing device or up and down buttons of a remote controller for the recording and/or playback apparatus 1, the preview-scene display unit 15 replaces the displayed representative images with representative images of preview scenes extracted from content belonging to another cluster in the preview-scene display area 63. For example, in a case where a drama 1 belongs to a cluster, if the cluster selector button 62 is operated, the representative images regarding the drama 1 are replaced with representative images 64 of preview scenes of a drama 2.

Furthermore, the recording and/or playback apparatus 1 may be configured in such a manner that the screens shown in FIGS. 10 and 11 display words utilized in preview-scene extraction. A user may also be able to specify a word through the screens so that it will not be utilized for preview-scene extraction. Processing for deleting words that do not match the preference of a user from word features will be described with reference to FIG. 13.

Scenes played back by a user and scenes that the user specified through a screen or the like because the scenes match the user's preference are determined to be scenes that match the user's preference. Moreover, scenes not played back by a user while content is being played back and scenes that the user specified through a screen or the like because the scenes do not match the user's preference are determined to be scenes that do not match the user's preference. Furthermore, words that the user does not want to utilize in preview-scene extraction from among an EPG, information regarding captions, and the like will not be utilized when word features are calculated.

The following will describe a method for updating the preference data stored in the preference storage unit 12 in accordance with an operation or the like performed to the recording and/or playback apparatus 1 by a user. Here, the following will not describe a method for updating the preference data in a case where a user operates the recording and/or playback apparatus 1 to, for example, stop a fast-forward operation and play back a scene or to specify a scene as a scene that matches the user's preference, because this method is the same as that described above with reference to FIG. 6.

Figure 12:
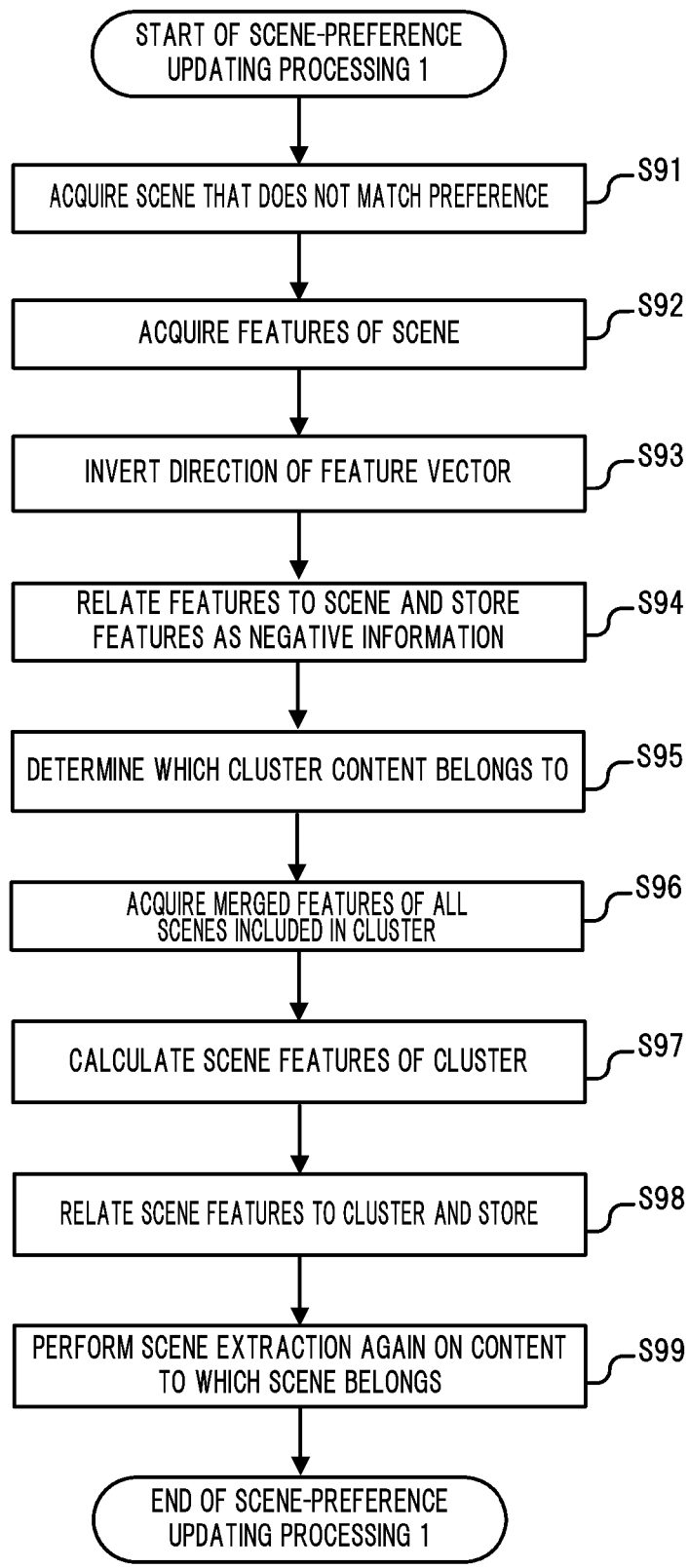
FIG. 12 is a flowchart showing scene-preference updating processing in the preference analysis unit.

FIG. 12 is a flowchart showing the scene-preference updating processing 1 in the preference analysis unit 11. When the preference analysis unit 11 receives information indicating a scene that a user specified from among preview scenes because the scene does not match the user's preference, the preference analysis unit 11 executes processing shown in FIG. 12.

First, in step S91, the scene specifying unit 21 acquires a scene that a user specified because the scene does not match the user's preference. In step S92, the scene-feature calculation unit 22 acquires the scene features, which are represented by a scene feature vector, of the scene acquired in step S91 from the preference storage unit 12.

In step S93, the scene-feature calculation unit 22 inverts the scene feature vector acquired in step S92. In step S94, the scene-feature calculation unit 22 relates the scene features updated in step S93 to information used to identify the scene, and stores the scene features, the information, and a flag indicating "negative" information in preference storage unit 12.

Processing from steps S95 to S98 is similar to processing from steps S54 to S57, respectively, shown in FIG. 6.

In step S99, the preference analysis unit 11 commands the preference determination unit 14 to perform preview-scene extraction processing again on the content including the specified scene acquired in step S91. The scene-preference updating processing 1 ends.

The processing shown in FIG. 12 updates the preference data in such a manner that preview-scene extraction will not be affected by the features of the scene that the user specified from among preview scenes in step S9 shown in FIG. 2A because the scene does not match the user's preference and the features of the scene that has been fast forwarded and not played back in step S27 shown in FIG. 2B. Thus, the recording and/or playback apparatus 1 according to this embodiment can extract scenes that match the preference of a user with higher accuracy by utilizing preference data of the user.

Figure 13:
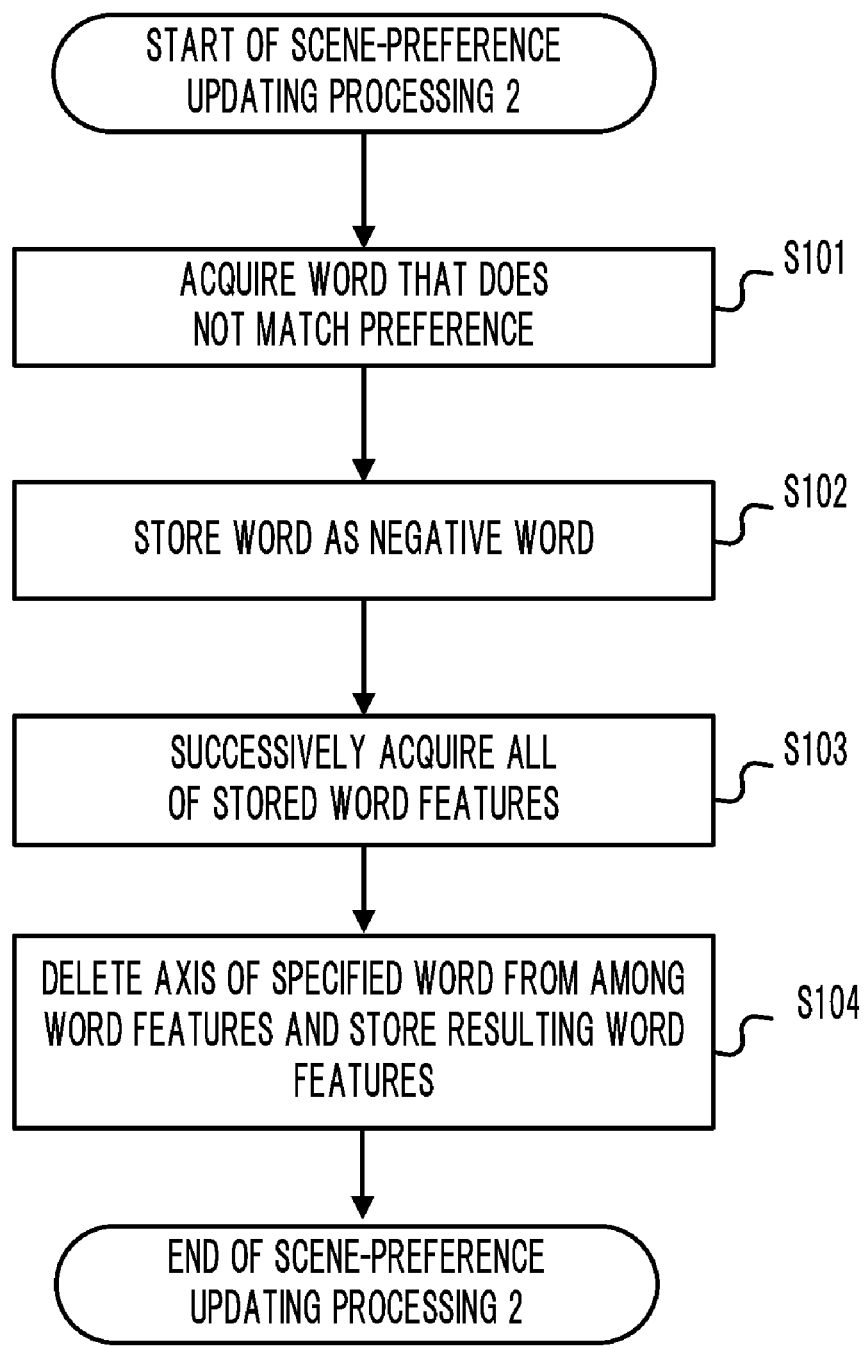
FIG. 13 is a flowchart showing scene-preference updating processing in the preference analysis unit.

FIG. 13 is a flowchart showing the scene-preference updating processing 2 in the preference analysis unit 11. When the preference analysis unit 11 receives a word that a user specified by determining that the word does not match the user's preference, the preference analysis unit 11 executes processing shown in FIG. 13.

First, in step S101, the feature acquisition unit 25 acquires a word that a user specified because the word does not match the user's preference. In step S102, the scene-feature calculation unit 22 stores the word acquired in step S101 as a "negative word" in the preference storage unit 12. Negative words mean words specified by a user so as not to be utilized for preview-scene extraction, from among words extracted from a scene and content including the scene.

In step S103, the scene-feature calculation unit 22 successively acquires all the word features stored in the preference storage unit 12. All the word features include word features acquired from an EPG and the text of web pages regarding all the content and word features acquired from information regarding captions and the like of all the scenes. That is, all the word features include cluster features, preferred-scene features, and all the scene features regarding all the clusters.

In step S104, the scene-feature calculation unit 22 deletes, from the feature vector, the axis of the word acquired in step S101 and included in the word features acquired in step S103, and stores the resulting word features in the preference storage unit 12 again. The scene-preference updating processing 2 ends.

As described above, when a user specifies a word that the user does not want to utilize in preview-scene extraction (in step S11 shown in FIG. 2A), the preference data is updated and the axis of the specified word is deleted from the axes of the word feature vector so as not to affect preview-scene extraction. Thus, the recording and/or playback apparatus 1 according to this embodiment can extract scenes that match the user's preference with higher accuracy by utilizing the preference data.

Figure 14:
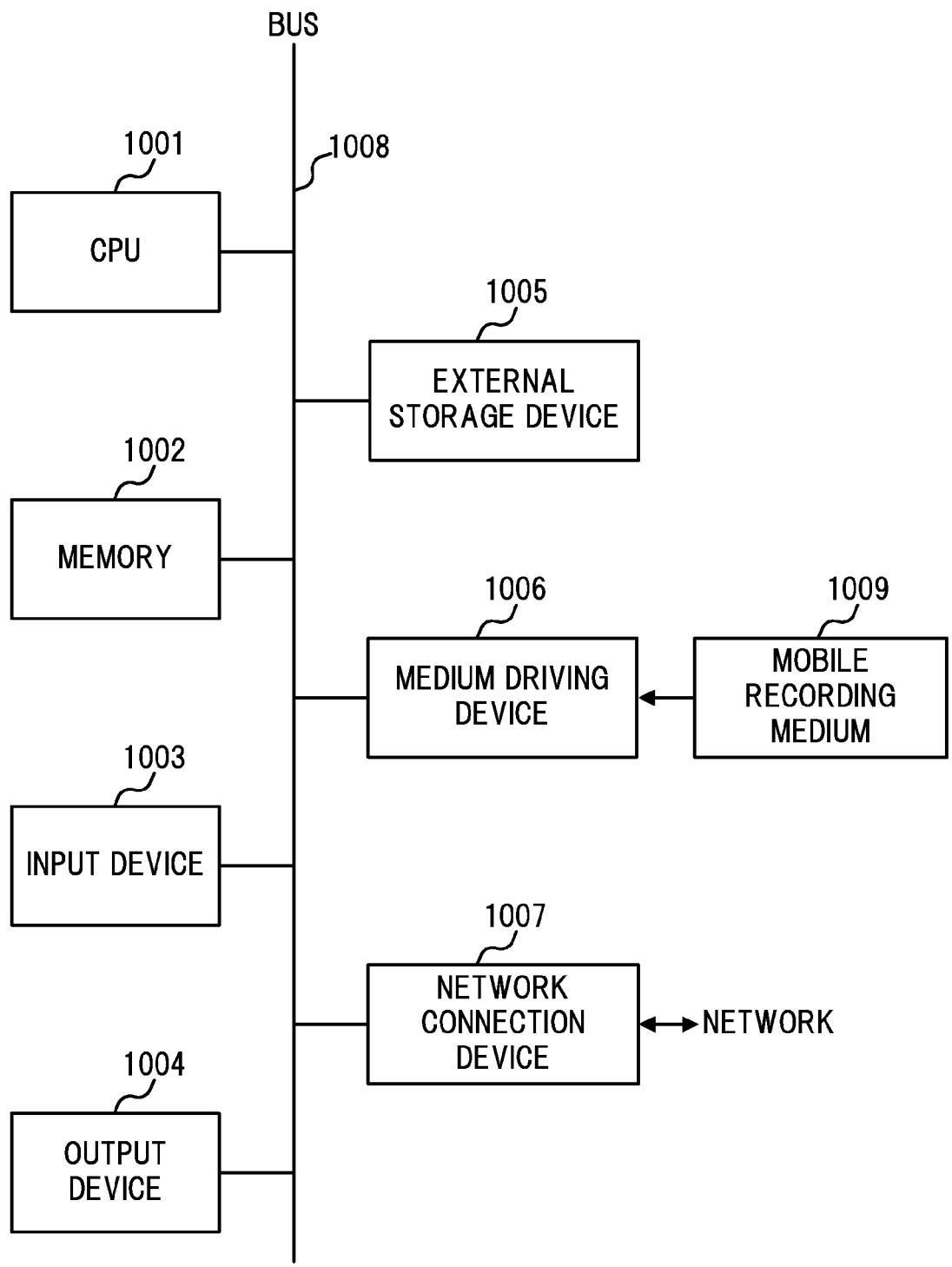
FIG. 14 is a block diagram of an information processing device.

The recording and/or playback apparatus 1 shown in FIG. 1 may employ, for example, an information processing device (a computer) as shown in FIG. 14. The information processing device shown in FIG. 14 includes a central processing unit (CPU) 1001, a memory 1002, an input device 1003, an output device 1004, an external storage device 1005, a medium driving device 1006, and a network connection device 1007, which are connected to each other via a bus 1008.

The memory 1002 includes, for example, a read only memory (ROM) and a random access memory (RAM), and stores programs and data to be used in processing. The CPU 1001 performs necessary processing by executing programs utilizing the memory 1002.

The preference analysis unit 11, the scene division unit 13, the preference determination unit 14, and the preview-scene display unit 15 shown in FIG. 1 correspond to functions achieved by executing the programs stored in the memory 1002.

The input device 1003 includes, for example, a keyboard, a pointing device, and a touch panel, and is used to input instructions from a user and information. The output device 1004 includes, for example, a display and speakers, and is used to make an inquiry to a user or to output processing results and the like.

The external storage device 1005 includes, for example, a magnetic-disk device, an optical-disk device, a magneto-optical disk device, and a tape device. The information processing device stores the above-described programs and data such as information regarding preference in the external storage device 1005 in advance, and uses them by loading them into the memory 1002 as necessary.

The medium driving device 1006 drives a mobile recording medium 1009 and accesses content recorded therein. The mobile recording medium 1009 is an arbitrary, computer readable recording medium such as a memory card, a flexible disk, a compact disk read only memory (CD-ROM), an optical disk, and a magneto-optical disk. An operator stores the above-described programs and data in the mobile recording medium 1009 in advance, and uses them by loading them into the memory 1002 as necessary.

The network connection device 1007 is connected to an arbitrary communication network such as a local area network (LAN), and the Internet, and converts data for performing communication. The information processing device receives the above-described programs and data as necessary from an external device via the network connection device 1007, and uses them by loading them into the memory 1002.

Figure 15:
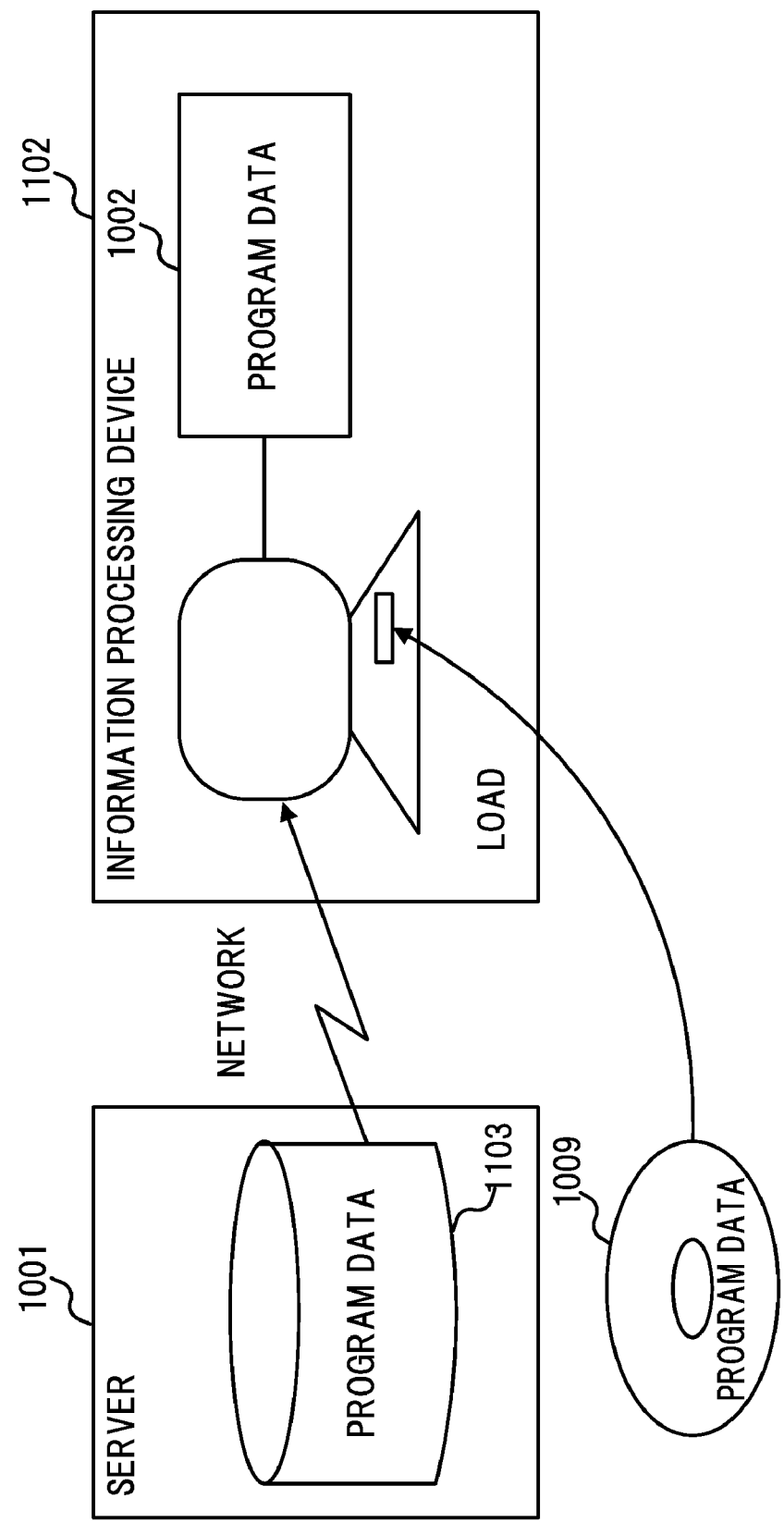
FIG. 15 is a diagram showing a recording medium.

FIG. 15 shows a computer readable recording medium, which can be used to supply programs and data to the information processing device shown in FIG. 14. The programs and data stored in the mobile recording medium 1009 and a database 1103 of a server 1101 are loaded into a memory 1002 of an information processing device 1102. The server 1101 generates a carrier signal for carrying the programs and data to transmit them to the information processing device 1102 via a network. The CPU 1001 executes the programs using the data and performs necessary processing.

As described above, when the recording and/or playback apparatus 1 according to this embodiment receives an operation instruction such as playback, a fast-forward operation, or a rewind operation performed when a user views content, the recording and/or playback apparatus 1 generates the preference data of the user in accordance with the operation instruction. The preference data includes features of scenes that match the user's preference. When the recorder/playback apparatus 1 has recorded content different from the content on which playback or the like is performed, the recording and/or playback apparatus 1 utilizes the preference data and extracts a scene having a similar feature to the content from among recorded content. The recording and/or playback apparatus 1 can extract a scene that match the user's preference from recorded content regardless of whether the user has viewed the recorded content or not.

Extracted scenes are output and displayed as preview scenes. Preview scenes specified by a user are determined to be scenes that match the user's preference, and the features of the specified scenes are used to update the preference data. When there are scenes that the user specified because the scenes do not match the user's preference, the preference data is updated in such a manner that the features of the scenes do not affect preview-scene extraction. When there are words that the user has specified and do not want to utilize in preview-scene extraction from among words obtained from an EPG, information regarding captions, and the like, the preference data is updated in such a manner that the features of the words are not to be utilized for calculation of feature values. Thus, scenes that match the preference of a user with higher accuracy can be extracted.

Here, the recording and/or playback apparatus 1 with a content recording function has been described above; however, this is an example. For example, the above-described method may be executed by a playback apparatus without a content recording function.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:

1. A playback apparatus for playing back video content, comprising:
   a memory storing instructions; and
   a processor executing at least some of the instructions stored in the memory to perform operations including
   dividing the video content into a first set of scenes;
   specifying a first scene played back after a fast-forward operation or a rewind operation is instructed by referring to the memory in which an instruction executed while the video content, which has been divided into the first set of scenes, is being played back and a played scene being played back when the instruction is received are related to each other and recorded;
   calculating a first feature value of the first scene;
   dividing additional content, different from the video content, into a second set of scenes;
   calculating second feature values, respectively corresponding to the second set of scenes;
   comparing the first feature value with the second feature values;
   extracting a second scene from the second set of scenes, having a second feature value different than the first feature value by no more than a predetermined threshold;
   outputting the second scene;
   calculating an average of the first feature value and the second feature value of the second scene;
   storing the average as the first feature value.

2. The playback apparatus according to claim 1, wherein when receiving an instruction indicating that the second scene extracted by the extraction unit should not be extracted by the extraction unit, the processor inverts a vector direction of the second feature value, calculates the average of the first feature value and the second feature value with the vector direction inverted, and utilizes the average as the first feature value.

3. The playback apparatus according to claim 1, wherein the processor further executes instructions to
   delete, from a vector space where a word feature is allocated to an axis, the axis of a word that has been determined to not be utilized for calculating the first and second feature values, the word being included in words extracted from the second scenes and the video content and the additional content including the first and second scenes and used to calculate the first and second feature values.

4. The playback apparatus according to claim 1,
   wherein the processor further executes instructions that determine to which cluster the video content belongs in accordance with details of the video content, and
   wherein the extracting extracts the first feature value of the video content that belongs to the cluster that was determined and that matches a cluster to which the content belongs, and is used in the comparing of the first feature value with the second feature values.

5. A video-content playback method performed by a playback apparatus, comprising:
   dividing video content into a first set of scenes;
   specifying a first scene played back after a fast-forward operation or a rewind operation is instructed by referring to a recording unit in which an instruction executed while the video content, which has been divided into the first set of scenes, is being played back and a played scene being played back when the instruction is received are related to each other and recorded;
   calculating a first feature value of the first scene;
   dividing additional content different from the video content into a second set of scenes and calculating second feature values, respectively corresponding to the second set of scenes;
   comparing the first feature value with the second feature values;
   extracting a second scene from the second set of scenes, having a second feature value different than the first feature value by no more than a predetermined threshold;
   outputting the second scene
   calculating an average of the first feature value and the second feature value of the second scene;
   storing the average is utilized as the first feature value.

6. The video-content playback method according to claim 5, wherein when an instruction indicating that the second scene should not be extracted is received, a vector direction of the second feature value is inverted and the average of the first feature value and the second feature value is calculated after the vector direction has been inverted, prior to the average being stored as the first feature value.

7. The video-content playback method according to claim 5, wherein the axis of a word to which an instruction not to be utilized for calculating the first and second feature values is given is deleted from a vector space where a word feature is allocated to an axis, the word being included in words extracted from the second scenes and the video content and the additional content including the first and second scenes and used to calculate the first and second feature values.

8. The video-content playback method according to claim 5,
   further comprising causing a computer to execute instructions determining to which cluster the video content belongs in accordance with details of the video content, and
   wherein in the extracting of the second scene, the first feature value of the video content that belongs to the cluster that matches a cluster to which the content belongs is extracted, and is used in comparing the first feature value with the second feature values.

* * * * *

UNITED STATES PATENT AND TRADEMARK OFFICE
CERTIFICATE OF CORRECTION

PATENT NO. : 8,406,606 B2
APPLICATION NO. : 12/764350
DATED : March 26, 2013
INVENTOR(S) : Shuichi Shiitani et al.

It is certified that error appears in the above-identified patent and that said Letters Patent is hereby corrected as shown below:

In the Claims:

Column 15, Line 45, In Claim 1, after "scene;" insert -- and --.
Column 16, Line 31, In Claim 5, delete "scene" and insert -- scene; --, therefor.
Column 16, Line 33, In Claim 5, after "scene;" insert -- and --.
Column 16, Line 34, In Claim 5, after "average" delete "is utilized".

Signed and Sealed this
Second Day of July, 2013

Teresa Stanek Rea
*Acting Director of the United States Patent and Trademark Office*